United States Patent
Dorn et al.

(10) Patent No.: US 10,158,248 B2
(45) Date of Patent: Dec. 18, 2018

(54) COMMUNICATION FAILURE HANDLING

(71) Applicant: Kohler Co., Kohler, WI (US)

(72) Inventors: Douglas W. Dorn, Sheboygan Falls, WI (US); Isaac S. Frampton, Strattanville, PA (US); Steve Jungers, Random Lake, WI (US)

(73) Assignee: Kohler Co., Kohler, WI (US)

( * ) Notice: Subject to any disclaimer, the term of this patent is extended or adjusted under 35 U.S.C. 154(b) by 619 days.

(21) Appl. No.: 14/570,642

(22) Filed: Dec. 15, 2014

(65) Prior Publication Data

US 2016/0172905 A1 Jun. 16, 2016

(51) Int. Cl.
| | |
|---|---|
| H02J 11/00 | (2006.01) |
| H02J 3/40 | (2006.01) |
| H02J 3/46 | (2006.01) |
| H02J 3/38 | (2006.01) |
| H02J 9/06 | (2006.01) |
| H02J 13/00 | (2006.01) |

(52) U.S. Cl.
CPC ............... *H02J 11/00* (2013.01); *H02J 3/38* (2013.01); *H02J 3/40* (2013.01); *H02J 3/46* (2013.01); *H02J 9/061* (2013.01); *H02J 13/00* (2013.01); *Y02B 90/222* (2013.01); *Y02E 40/72* (2013.01); *Y04S 10/12* (2013.01); *Y04S 20/12* (2013.01)

(58) Field of Classification Search
CPC ....................................................... H02J 11/00
See application file for complete search history.

(56) References Cited

U.S. PATENT DOCUMENTS

| | | | |
|---|---|---|---|
| 4,677,364 A | 6/1987 | Williams et al. |
| 5,194,757 A | 3/1993 | Wertheim |
| 5,568,399 A | 10/1996 | Sumic |
| 6,150,736 A | 11/2000 | Brill |
| 6,184,593 B1 | 2/2001 | Jungreis |
| 6,191,500 B1 | 2/2001 | Toy |
| 6,509,657 B1 | 1/2003 | Wong et al. |

(Continued)

FOREIGN PATENT DOCUMENTS

| | | |
|---|---|---|
| GB | 2271680 | 4/1994 |
| WO | WO9931860 A1 | 6/1999 |

OTHER PUBLICATIONS

European Search Report for related European Application No. 15197174.4 dated May 4, 2016.

(Continued)

*Primary Examiner* — Alfonso Perez Borroto
(74) *Attorney, Agent, or Firm* — Lempia Summerfield Katz LLC (57) ABSTRACT

An electrical power generator system may include two or more paralleled generators. At least one of the generators includes a first power source and a second power source. A disconnection of a first power source is identified at a generator controller of one of the generators. The generator controller may be configured to access or generate a power failure message indicative of the disconnection of the first power source. The generator controller may be configured to transmit the power failure message using the second power source because the second power source is switched to the generator controller in response to the disconnection of the first power source. The system may enter a communication failure handling mode based on the power failure message.

20 Claims, 9 Drawing Sheets

(56) References Cited

U.S. PATENT DOCUMENTS

| | | |
|---|---|---|
| 6,657,321 B2 | 12/2003 | Sinha |
| 6,665,635 B2 | 12/2003 | Shimizu et al. |
| 6,854,065 B2 | 2/2005 | Smith et al. |
| 6,958,550 B2 | 10/2005 | Gilbreth et al. |
| 6,980,891 B2 | 12/2005 | Nagafuchi et al. |
| 7,061,139 B2 | 6/2006 | Young et al. |
| 7,358,620 B2 | 4/2008 | Melfi |
| 7,679,219 B2 | 3/2010 | Labitzke et al. |
| 8,258,640 B2 | 9/2012 | Conway et al. |
| 8,552,589 B2 | 10/2013 | Ghosh et al. |
| 8,615,330 B2 | 12/2013 | Dong et al. |
| 8,792,217 B2 | 7/2014 | Shah et al. |
| 8,803,363 B2 | 8/2014 | Veltri |
| 2001/0022472 A1* | 9/2001 | Codina .................. H02J 9/061 307/66 |
| 2004/0158360 A1 | 8/2004 | Garland, II et al. |
| 2010/0148584 A1 | 6/2010 | Yang et al. |
| 2011/0278934 A1 | 11/2011 | Ghosh et al. |
| 2012/0032516 A1* | 2/2012 | Lee .......................... G06F 1/30 307/66 |
| 2013/0246815 A1* | 9/2013 | Uehara .................. H02J 9/061 713/300 |
| 2013/0285455 A1 | 10/2013 | Hunter et al. |
| 2014/0359351 A1 | 12/2014 | Shah et al. |
| 2015/0183419 A1* | 7/2015 | Chae .................. B60W 20/106 701/22 |

OTHER PUBLICATIONS

European Office Action dated Feb. 13, 2018, European Office Action cited in the corresponding European Patent Application No. 15197174.4; dated Feb. 13, 2018; 5 pages.

\* cited by examiner

COMMUNICATION FAILURE HANDLING

TECHNICAL FIELD

This disclosure relates in general to communication failure handling, or more particularly, to a modification of communication failure handling in paralleled generators when one of the generators experiences a battery disconnection.

BACKGROUND

An engine-generator set, which may be referred to as a generator or a genset, may include a power source (e.g., an engine) and an alternator or another device for generating electrical energy or power from mechanical energy. The generator may provide backup power in the event of a break in power utility service. Breaks in service may be unacceptable to customers, and some businesses may have mission critical systems, such as computer systems in call centers or refrigerators in grocery stores, that rely on constant power.

Other generator customers may be reliant on the generators for a primary source of power. Both these prime power installations and backup installations may include multiple generators that may be paralleled or synchronized. When one of the parallel generators goes offline, the other generators may attempt to compensate or otherwise mitigate the failure. For example, the other generators may deactivate paralleling controls and operate individually based on a current load on the system.

BRIEF DESCRIPTION OF THE DRAWINGS

Exemplary implementations are described herein with reference to the following drawings.

DETAILED DESCRIPTION

One or more generators may provide power to a load through a generator bus. The generator bus is an electrically conductive path and may be selectively connected through multiple circuit breakers or other types of switches to the generators, the utility system, and other devices. A common generator system includes two or more generators connected to a generator bus through circuit breakers and a utility connection coupled to the generator bus through a utility breaker. Each generator may include a local generator controller that may manage the control of the circuit breakers and paralleling operation with the other generators.

Paralleled generators may be programmed to enter into a failure mode in response to a loss in communication from one of the generators. The loss of communication may be an absence of regular communication messages from one of the generators. Sometimes the absence of messages means that the generator has permanently failed or has been disconnected from the bus. Sometimes the absence of messages means that the generator has temporarily stopped running. The temporary stoppage may be intentional or predictable.

When paralleled generators stop communicating, there may be a risk of two or more of the generators closing to the bus out of phase due to closing simultaneously to a dead bus, which may cause a failure of the system or damage to the generators. In normal operation, fully functioning set of generators may follow first on logic. That is, when one of the generators reaches the rated voltage and frequency, the generator communicates to the other generators that it intends to close to the bus. The first generator closes to the dead bus. Subsequently, the other generators having deferred closing to the dead bus, detect the phase on the bus and synchronize and close to the live bus.

However, this first on logic is not operable when one or more of the generators cannot communicate and cannot announce the imminent closure to the bus. Hence, the generators may default to permitting dead bus closure in an allocated time slice, prohibiting simultaneous closure. The disadvantage to this failure handling is that the time for a generator to close its paralleling breaker may be greatly extended while waiting for the appropriate time slice.

When the generators are operating in parallel, the generators may communicate real and reactive power levels to each other in order to share the load. If the communication fails in this scenario, the generators may not be able to share the load anymore. This may result in an overload of some generators or reverse powering other generators. To avoid this failure mode, the generators may react to a communication failure by entering a failure mode such as droop sharing mode.

In the droop sharing mode, the other generators each operate independently, and adjust speed based on the load. While droop mode is effective, when no communications are possible at all, droop mode may lead to inefficiencies, generators speeding up and down, and an unload/load cycle, in which the power requirement of the load is met by varying degrees by each of the generators, potentially causing speed instability as the generators react to the changing load.

There are some instances in which droop mode should be avoided. Specifically, when one of the generators is temporarily disconnected or out of communication (e.g., intentionally disabled from starting for service, troubleshooting, or routine maintenance) with the other paralleled generators, the system of generators may benefit from avoiding the activation of droop mode in response to a lack of communication. There may be no need to revert to a communication failure handling method if a generator is intentionally disabled, as it should be unable to start, prohibiting it from closing to a dead bus and from connecting to a live one to operate in parallel. The following examples include techniques through which the generator that may soon be temporarily be out of communication because the generator was intentionally disabled from starting for service, troubleshooting, or routine maintenance, may warn the other generators just before communication ceases.

Figure 1:
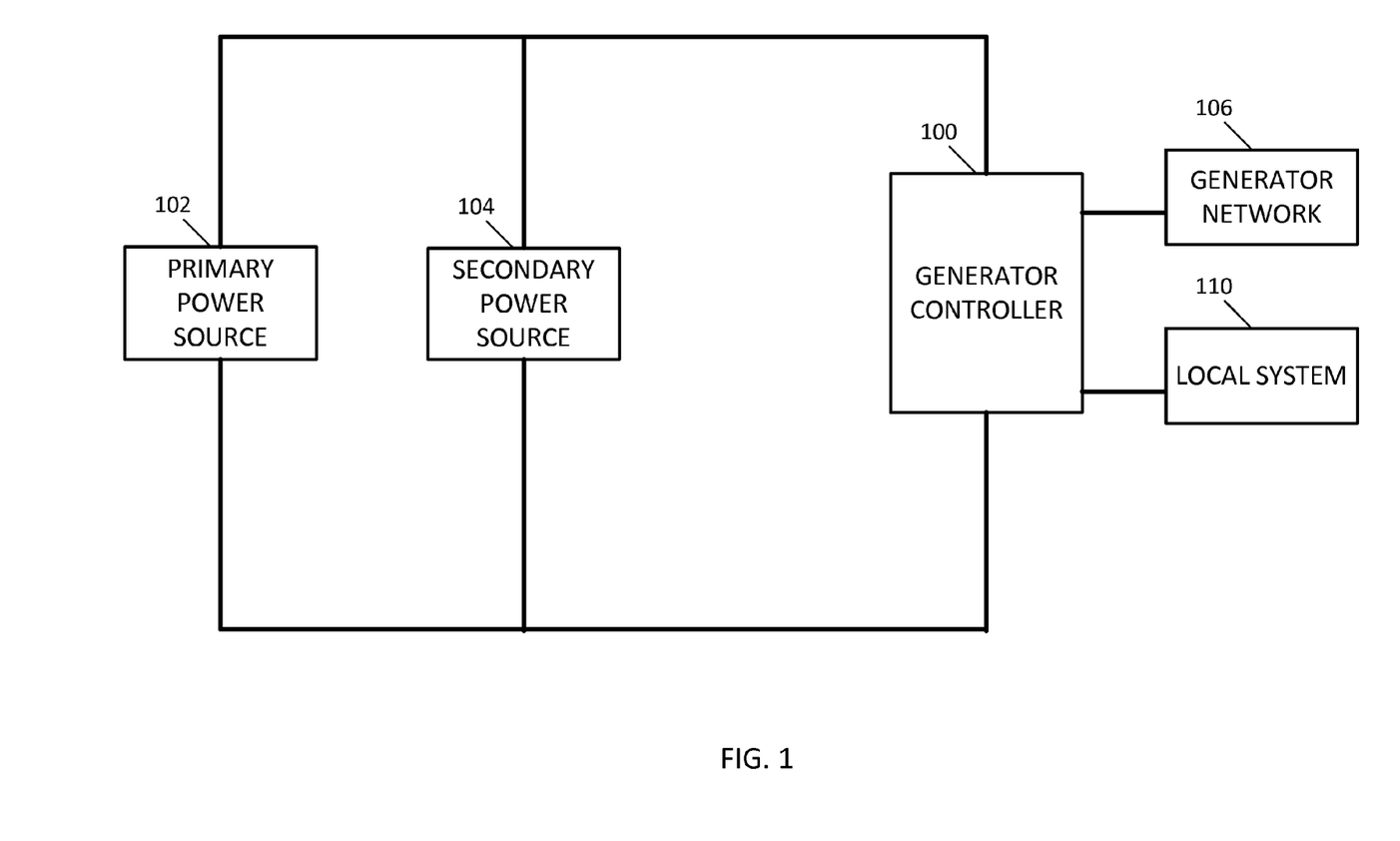
FIG. 1 illustrates an example generator including multiple power sources.

FIG. 1 illustrates an example generator including multiple power sources. The generator may include an electrical system including a generator controller 100, a primary power source 102, a secondary power source 104 and a local system 110 including an engine, an alternator, and other components for converting mechanical energy to electrical energy. The generator may be in communication with a generator network 106 comprising one or more other paralleled generators. Additional, different or fewer components may be included.

The primary power source 102 may provide power (e.g., direct current (DC)) to the generator controller 100 for normal operation. The generator controller 100 may generate communication messages to transmit to the generator network 106 through power from the generator controller 100. When the primary power source 102 is disconnected or fails, the primary power source 102 ceases to provide power to operate the generator controller 100. The secondary power source 104 is switched to the generator controller 100 in response to the disconnection of the first power source 102.

The generator controller 100 may identify or detect the disconnection or failure of the primary power source 102. When the primary power source 102 is disconnected, the secondary power source 104 supplies power to the generator controller 100. The detection of the disconnection may be based on a change in the power supplied to the generator controller 100.

In one example, the generator controller 100 monitors the input power to the generator controller 100 (e.g., the power pin or $V_{cc}$). The primary power source 102 may be at a first voltage level (e.g., 24 V) and the secondary power source 104 may be at a second voltage level (e.g., 12 V). When the primary power source 102 becomes disconnected, the generator 100 controller may detect a change from the first voltage level to the second voltage level. In another example, the generator controller 100 may detect a brief disruption in power as the primary power source 102 is disconnected and the secondary power source 104 takes its place.

In another example, the generator controller 100 monitors the impedance seen by the generator controller 100. The primary power source 102 may be measured at a different impedance than the secondary power source 104. In addition, when the primary power source 102 becomes disconnected, the total impedance may change. For example, the generator controller 100 would see the combined impedance of the primary power source 102 and the secondary power source 104 in parallel when the primary power source 102 is connected, and see only the impedance of the secondary power source 104 when the primary power source 102 is disconnected.

The generator controller 100 may generate a power failure message indicative of the disconnection of the first power source 102 in response to detecting the disconnection of the primary power source 102. The power failure message may indicate that the generator controller 100 should be out of communication for a temporary time period. The power failure message may be transmitted to the generator network 106 for reception by one or more paralleled generators using power from the secondary power source 104, which may be a temporary time period because it supplies power for a transient period or for a predetermined period of time. The power failure message may also indicate that the generator was intentionally removed or that it is unable to start or connect to the paralleling bus.

The power failure message may instruct the one or more paralleled generators to not change operation in response to a lack of communication from the generator controller 100. Thus, the paralleled generators may continue to operate normally for a specified time period or a time period specified in the power failure message. The primary power source 102 may come back online during the time period.

Figure 2:
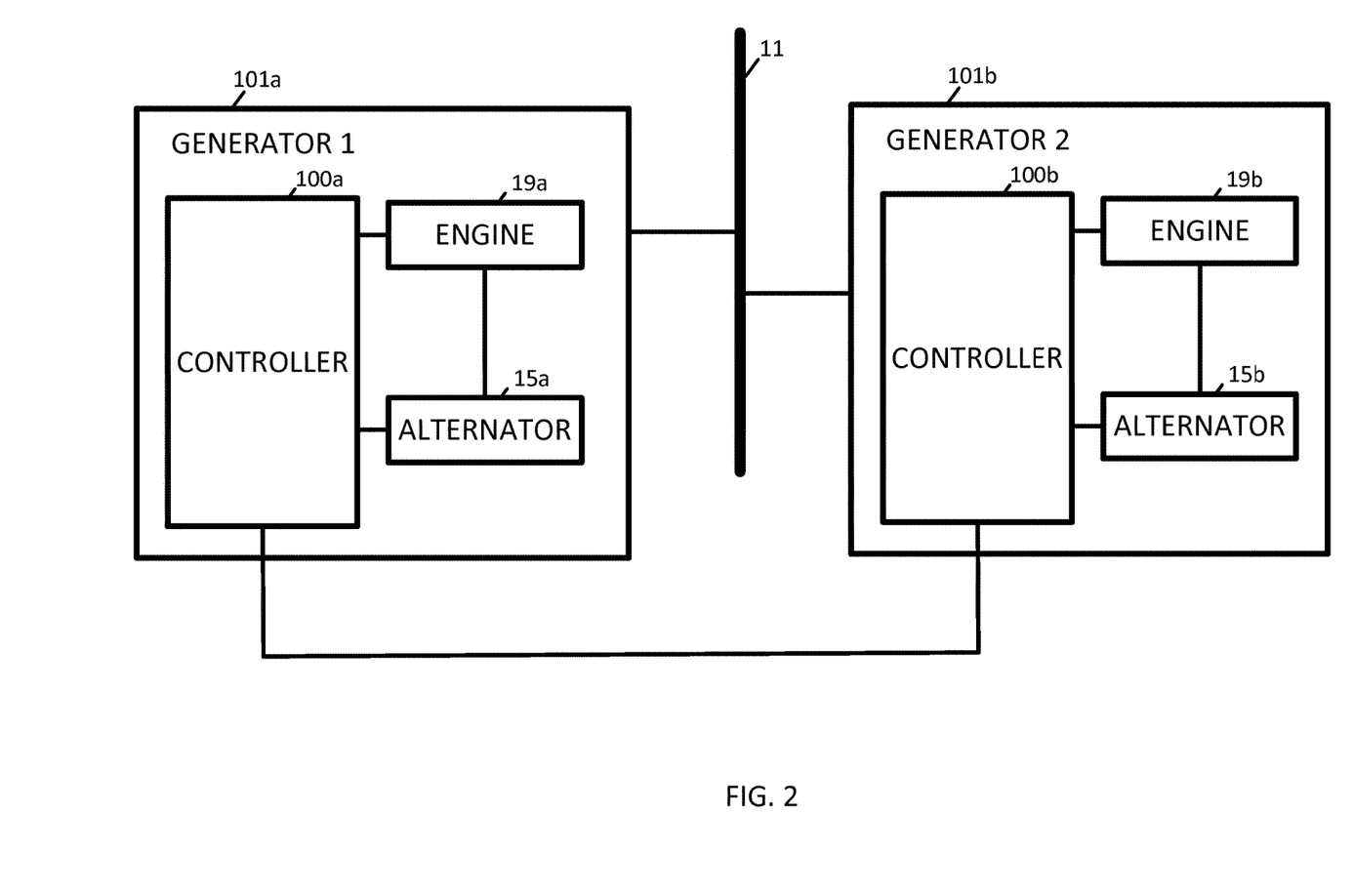
FIG. 2 illustrates an example set of parallel generators.

FIG. 2 illustrates an example set of parallel generators. In addition to the generator controllers 100a-b, the generators 101a-b include alternators 15a-b, and engines 19a-b. The alternators 15a and 15b may be electromechanical devices. The alternators 15a and 15b may include a rotating magnetic field and a stationary armature, a rotating armature with a stationary magnetic field, or a linear alternator. The engines 19a and 19b may be powered by gasoline, diesel fuel, or gaseous fuel. Additional, different, or fewer components may be included.

The generator controllers 100a-b may exchange messages. In one example, the generators 101a-b communicate according to a time schedule or time slices. For example, in a first time period, the generator controller 100a sends messages to generator controller 100b and during a second time period, the generator controller 100b sends messages to generator controller 100a. Each of the generator controllers 100a-b may send periodic messages to the other generator controller 100. The periodic messages may be sent to maintain the status or synchronization of the generators.

Because the generators 101a-b are connected to the bus 11 and in parallel operation, the generators 101a-b are forced to the same voltage and frequency. The generators may operate in a load sharing mode such as isochronous load sharing. The load sharing mode may cause the generators to balance excitation levels and speed. For example, when one of the generators has a higher excitation that the other generator, the reactive load is not shared equally. When one of the generators is regulated to a different speed, the real load is not shared equally. The generator controllers 100a-b may exchange load levels. The generator controllers 100a-b may adjust throttle levels to balance the loads but maintaining the same speed. When one generator reports a throttle at one level (e.g., 10%) and the other generator reports a throttle at a second level (e.g., 30%), the generators may adjust throttles to approximately an average throttle level (e.g., 20%). Load sharing modes cannot operate when the generators cannot communicate.

The generators 101a-b may operate in a droop mode without regard to feedback from the other generators. In droop mode the generators still share loads intrinsically. The more real load on the generator, the slower the engine runs. As real load increases, the speed regulator will target a lower speed and change throttle position to reduce fueling and provide less output power. As real load decreases, the speed regulator will target a higher speed and change throttle position to increase fueling and provide more output power. In either case, the generator may be running at undesirable frequency. In reactive droop, excitation or field current can no longer be communicated between generators. As reactive load increases, the voltage regulator will target a lower voltage and reduce excitation to provide less reactive power. As reactive load decreases, the voltage regulator will target a higher voltage and increase excitation to provide more reactive power. Eventually, the generators have the same excitation or field current, but voltage becomes variable. This causes disturbances such as flicker on the devices powered by the generators. The equilibrium voltage may be unacceptably high or low.

Either of the generator controllers 100a-b may enter a droop mode in response to a lack of communication from the other of the generator controllers 100a-b. The droop mode is an example of a failure mode. When one of the generators stops communication, the other enters the droop mode. However, when one of the generator controllers 100a identifies a temporary disconnection, causing the lack of communication, the other generator controller 100*b* may not enter droop mode and/or remain in load sharing mode.

The local system 110 may also include a fuel supply, a speed governor, a cooling system, an exhaust system, a lubrication system, and a starter. Additional, different, or fewer components may be included. Example types of generators include towable generators, portable generators, marine generators, industrial generators, residential generators or other standby generators. The generators may be portable or permanent.

The gaseous fuel may be liquefied petroleum gas (LPG), hydrogen gas, natural gas, biogas, or another gas. The LPG may be or include primarily butane, primarily propane, or a mixture of hydrocarbon gases. The hydrogen gas may include hydrogen mixed with air or oxygen. The hydrogen gas may be mixed with another fuel when delivered to the engine. Natural gas (e.g., compressed natural gas (CNG)) may be a hydrocarbon gas mixture. Biogas may be a gas produced by the breakdown of organic material. Other variations are possible.

Each of the generator controllers 100*a-b* may be connected to the components of both (or more) generators. For example, generator controller 100*a* is connected to engine 19*a* and alternator 15*a*. The generator controller 100*a* may control the ignition, speed and other operation of the engine 19*a*, and the field winding current and other parameters of the alternator 15*a*. However, the generator controller 100*a* may also control the operation of engine 19*a* and parameters of alternator 15*a*.

Figure 3:
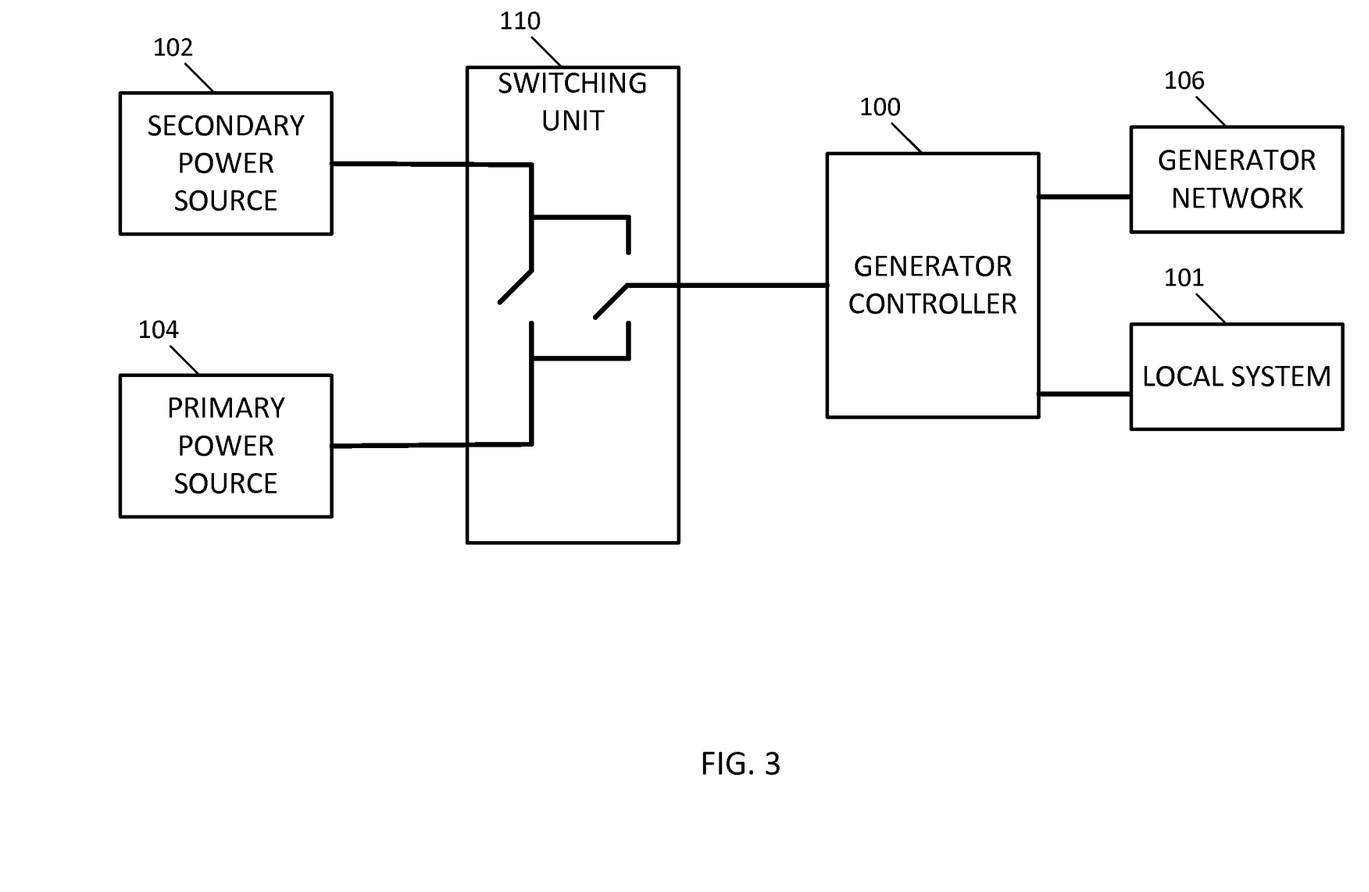
FIG. 3 illustrates an example generator including multiple power sources and a switching unit.

FIG. 3 illustrates an example generator including multiple power sources (the primary power source 102 and the secondary power source 104) and a switching unit 110. The primary power source 102 may be a battery such as a starting battery for starting or cranking the engine of the generator and supply power to the other systems of the generator, including the generator controller 100. The secondary power source 104 may be a second battery or a capacitor. The capacitor may be charged by the primary power source 102. The capacitor may have a capacitance in the range of 1 mF to 1 F, for example 10 mF (0.01 Farad or 10,000 microfarad). The capacitor may be a cylinder in the range of ¼ inch to 2 inches in diameter. The capacitor may be physically and electrically connected to the generator controller 100. The capacitor and the generator controller 100 may be mounted to the same printed circuit board.

The capacitor may have a capacitance sufficient to store enough energy to power the generator controller 100 to send a predetermined number of messages. The predetermined number of message may be one, two, four or another number. The amount of time for the predetermined number of messages may be defined by a communication protocol of the messages and a quantity of paralleled generators. The time slice of the communication protocol multiplied by the number of generators may be an amount of time sufficient for each generator to send a message at the corresponding time slice. For example, the time slice for the communication protocol may be 33 milliseconds and the number of generators may be 3, which provides the amount of time of 100 milliseconds. In another example, the bus cycle time for all nodes may be 33 milliseconds, allowing the generator to broadcast 3 messages in 100 milliseconds. The corresponding capacitance may be calculated from the amount of time and an operating current of the generator controller 100. The time slice may be assigned according to order the generators originally closed to the bus, according to serial number, or according to another technique.

In one alternative, the secondary power source 104 is a communication signal. For example, the secondary power source 104 may be a power component of a power over Ethernet signal that passes electrical power along with data over a communication line. The communication line may be a twisted pair of wires having a common mode voltage. Power over Ethernet may refer to the standards known as IEEE 802.3, which is hereby incorporated by reference. Thus, the generator controller 100 may be powered by a battery (e.g., primary power source 102), and fall back to power provided by the communication signal if the battery fails or is disconnected.

The switching unit 110 may be configured to connect and disconnect the primary power source 102 to the secondary power source 104 for charging. The switching unit 110 may be configured to connect and disconnect the primary power source 102 to the generator controller 100. The switching unit 110 may be configured to connect and disconnect the secondary power source 104 to the generator controller 100. The switching unit 110 may include an analog circuit. The analog circuit may include one or more metal oxide semiconductor field effect transistors (MOSFETs) or one or more other switching devices.

The generator controller 100 may monitor the supply of power from the secondary power source 104. In one example, the generator controller 100 include two power input ports or pins. One of the input pins may be associated with the primary power source 102, and one of the input pins may be associated with secondary power source 104. Thus, any signal, or a predetermined signal, on the input pin for the secondary power source 104 indicates that secondary or temporary power is being sent to the generator controller 100.

In one example, the generator controller 100 monitors the decay of the temporary power received from a capacitor discharging. When the temporary power decays to a predetermined voltage (e.g., 11 volts), the generator controller 100 identifies that temporary power is being applied and sends the power failure message. The predetermined voltage may be used to determine that the voltage decay is persistent so that brief decreases in voltage due to cranking the engine do not trigger detection of a battery disconnection. In another example, the generator controller 100 accesses or generates the power failure message in response to the temporary power meeting the threshold.

The failure power failure message may be a single bit, pulse modulated signal, or analog signal level that indicates a power failure. Alternatively, the power failure message may be a data packet including one or more fields. Example fields include the unit identifier of the generator, the failure state code, a measured voltage from either or both power sources, and/or a command for the other generator to follow. The unit identifier of the generator may be a communication address, a serial number, or another code that identifies the generator or the location of the generator. The failure state code may be an alphanumeric symbol representing battery disconnection, communication line cut, battery removal, battery signal degradation, or another failure. The code may indicate maintenance is in progress. The code may inform a controller associated with another generator that the generator controller 100 experienced the battery disconnection or other maintenance related to the battery disconnection. Multiple types of maintenance may require a battery disconnection. The maintenance may be a battery replacement, oil and filter change, connection of an accessory, radiator flush, air filter change, exhaust replacement, or other service.

The command or command code in the power failure message may indicate an action for the other generator to take. The action may instruct one or more other generators to not change operation in response to a lack of communication from the generator controller 100. The action may modify a failure mode of the external controller for the one or more other generators. The modification may be to ignore a lack of communication messages for a time period or until other notice is given. The action may be represented by a code to ignore a cessation of communication messages specifically from the generator controller 100.

The generator controller 100 may perform one or more other functions in response to a disconnection or failure of the primary power source 102 and/or switching to the secondary primary source 104. The generator controller 100 may generate a status message that is sent to a command center or user device that indicates that communication has failed. The generator controller 100 may disable one or more systems of the generator. The disabled systems may be unnecessary systems and/or systems that consume excess power. The disabled system may include a user interface, a display, an auxiliary input output system (e.g., universal serial bus) or another auxiliary system of the generator. The generator controller 100 may write unsaved data to a non-volatile memory. The unsaved data may include an assigned time slice, a sensor reading, user configurations or other data.

The other generator controllers receiving the power failure message may also perform one or more other functions in response to the power failure message. The other generator controllers may send probe messages to the silent generator controller to determine if the silent generator controller has come back online. The other generator controller may disable a system reset. The system reset may involve closing to the bus and should be avoided if the generator controllers are not currently communicating.

Figure 4:
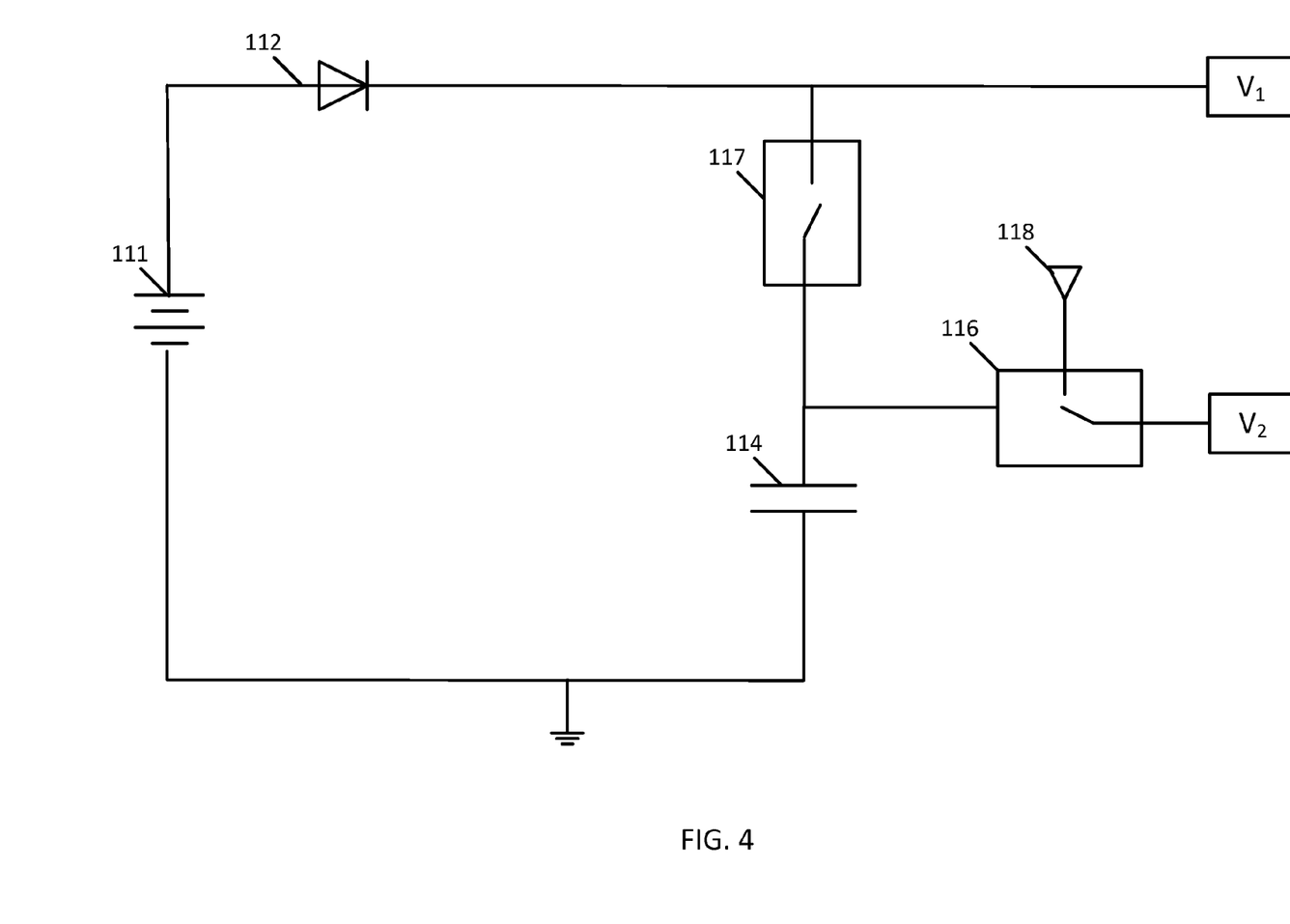
FIG. 4 illustrates an example switching circuit for multiple power sources of a generator.

FIG. 4 illustrates an example switching circuit for multiple power sources of a generator. The switching circuit may include a battery 111, a diode 112, a first switch 116, a second switch 117, a capacitor 114, and a voltage source 118. Additional, different, or fewer components may be included. The first switch 116 and the second switch 117 may be implemented in variety of techniques including one or more transistors or alternatively, one or more diodes, or combinations of transistors and diodes, including transistors with integral body diodes.

The battery 111 provides supply voltage $V_1$ to a generator controller. The supply voltage $V_1$ also charges the capacitor 114 when the second switch 117 connects the capacitor 114 to the battery 111 through diode 112. The capacitor 114 may be charged to voltage $V_1$ or another voltage specified by a rating of the capacitor 114. When the battery 111 is disconnected or fails, the second switch 117 may disconnect the capacitor 114 from the battery 111 and/or the power supply rail.

In addition, when the battery 111 is disconnected or fails, the first switch 116 may connect the controller to supply voltage $V_2$ to the generator controller. In one example, the capacitor 114 provides supply voltage $V_2$ to the generator controller directly. That is, the energy from the battery 111 is supplied at supply voltage $V_2$. In another example, the capacitor 114 activates the first switch 116 to cause supply voltage $V_2$ to be switched to a pin of the generator controller. The supply voltage $V_2$ may be a set supply voltage (e.g., 5 V), which may also be supplied by the capacitor 114. The supply voltage $V_2$ may be regulated at a lower level than voltage $V_1$ to supply components such as a microprocessor and analog circuitry.

Figure 5:
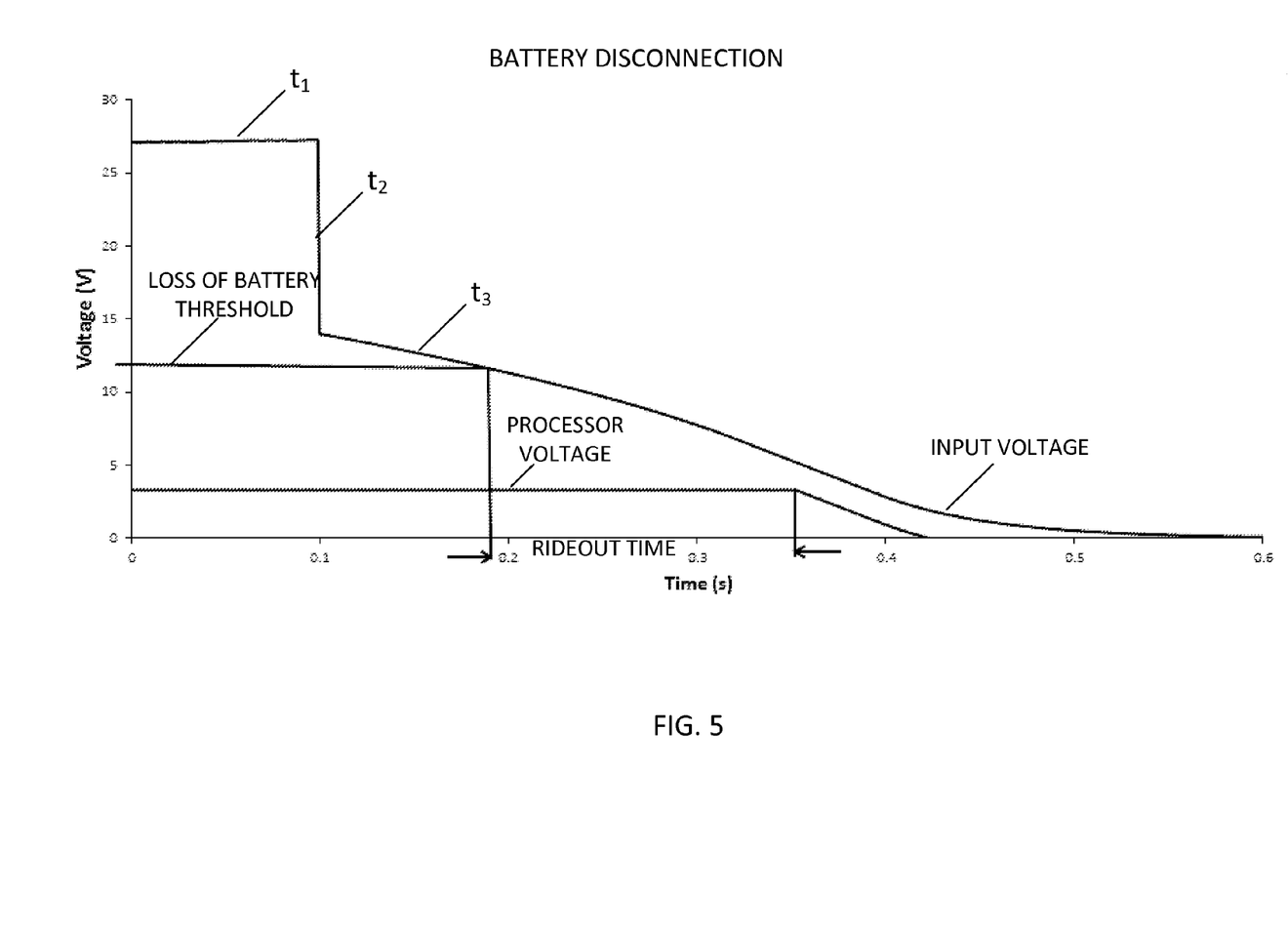
FIG. 5 illustrates an example time chart for battery disconnection.

FIG. 5 illustrates an example time chart for battery disconnection. The input voltage may be the power signal received at the generator controller. Initially, the input voltage may be at $V_1$ supplied from the battery, as shown by time period $t_1$. At or near time period $t_2$, the battery is disconnected and the switch is activated to provide power to the generator controller. During time period $t_3$, the capacitor discharges while supplying power to the generator controller. When the input voltage reaches a preset loss of battery threshold, the generator controller may signal the other generator controller that battery power has been lost. When sending the signal, the generator controller is powered by the capacitor. The supplied power, or processor voltage, is supplied during a rideout time, which extends from the time of switching until the supplied voltage falls below the set voltage for the processor voltage. During the rideout time, the capacitor discharges, supplying power to the generator controller to generate and/or send power failure messages described above.

The rideout time may extend multiple time slices of the generator controller to provide redundant messages. For example, when the time slice for communication between generator controllers is 30 milliseconds, the rideout time may be 90 milliseconds for three generators, and 180 seconds for three generators with a redundancy. With the redundancy, the generator with the disconnected battery has at least two opportunities to send the power failure message. Multiple redundancies may be used.

Figure 6:
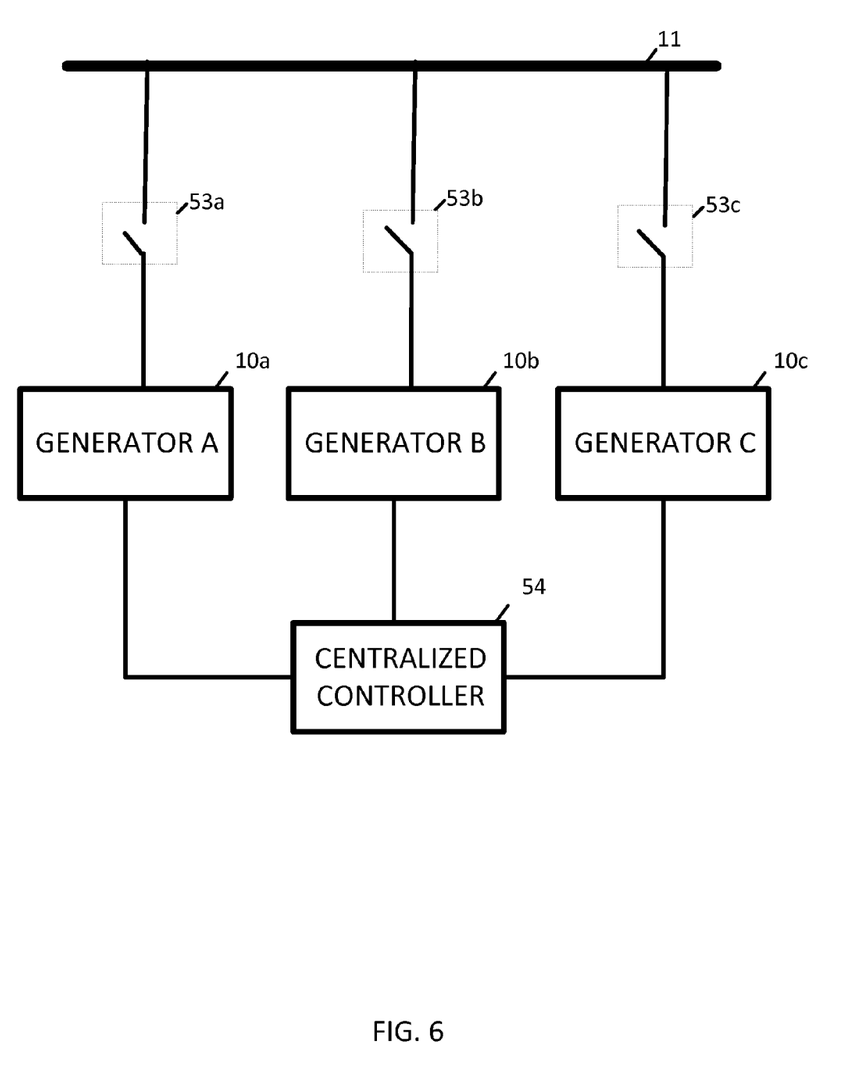
FIG. 6 illustrates an example set of parallel generators and a centralized controller.

FIG. 6 illustrates an example set of parallel generators 10*a-c* and a centralized controller 54. The set of parallel generators 10*a-c* may be configured to close to bus 11 through the operation of circuit breakers 53*a-c*. Additional, different, or fewer components may be included. The parallel generators 10*a-c* may communicate through the centralized controller 54 according to the time slice technique.

When any one of the parallel generators 10*a-c* experiences a battery disconnect, it may generate a power failure message that is sent to the centralized controller 54. The power failure message may be sent during an assigned time slice. The centralized controller 54 may identify the source of the power failure message based on a dedicated communication line through which the power failure message is received, a time slice that the power failure message is received, or an identifier included in the power failure message. The power failure message may be sent from the centralized controller 54 to the other generators according to the time slice. For example, when generator 10*a* experiences a battery disconnection, the centralized controller 54 may send power failure messages to generators 10*b* and 10*c*.

When the previously out of communication generator controller 10*a* returns to normal communication, the centralized controller 54 may forward the normal communication messages to the other generators 10*b* and 10*c*. In addition, the centralized controller 54 may specifically inform the other generators that all generators are operating normal. In response to the normal communication messages or normal operation message, the other generators may return to enabling droop mode if there is a subsequent loss of communication without a corresponding power failure message.

When the end of the battery disconnection is determined, the generator 10*a* may perform a synchronization process. The generator 10*a* may detect the voltage, phase, and/or frequency of the bus 11. The generator 10*a* may close to the bus 11 when it reaches the bus voltage and the bus frequency and a time that corresponds to the phase of the bus 11.

Figure 7:
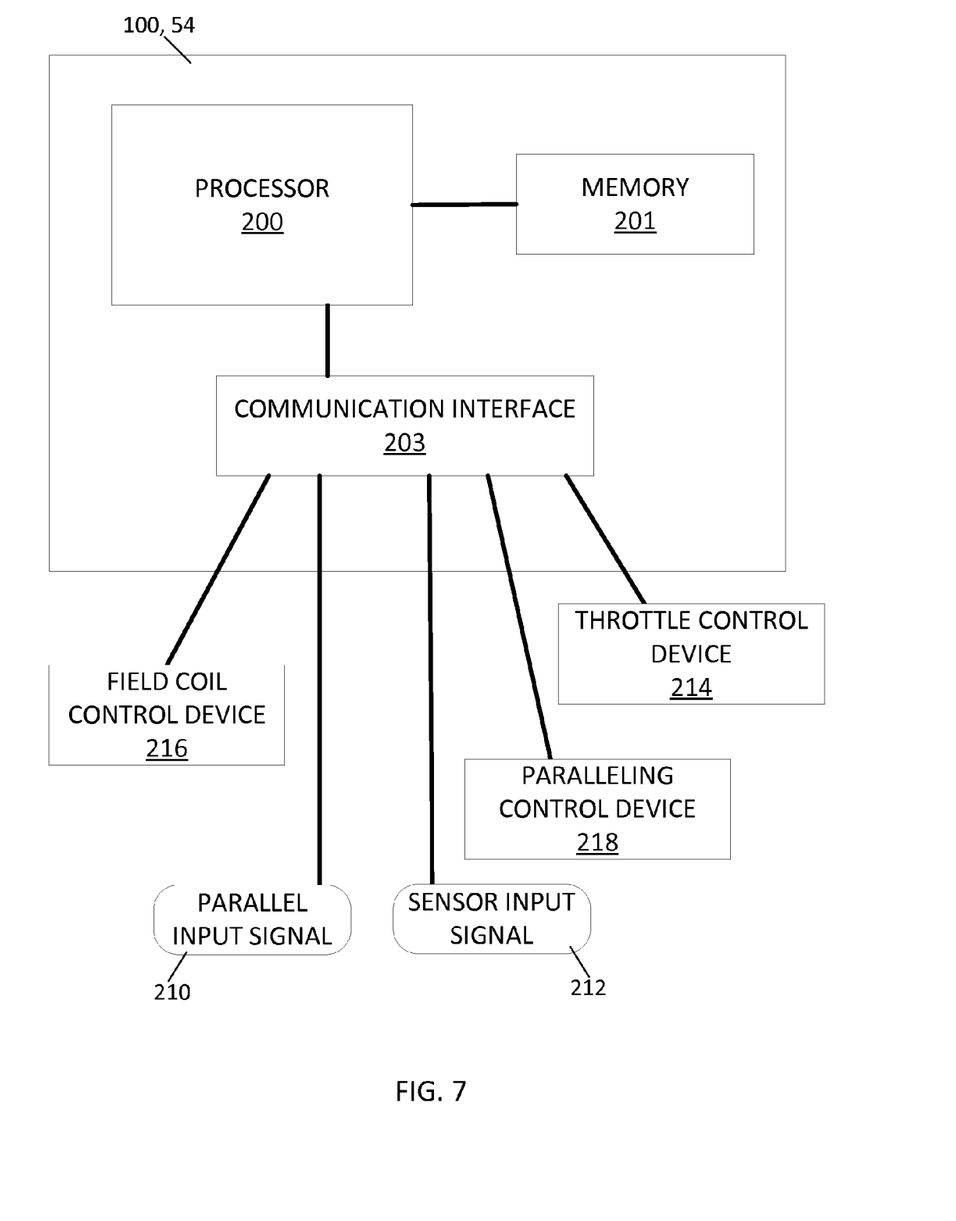
FIG. 7 illustrates an example generator controller.
Figure 8:
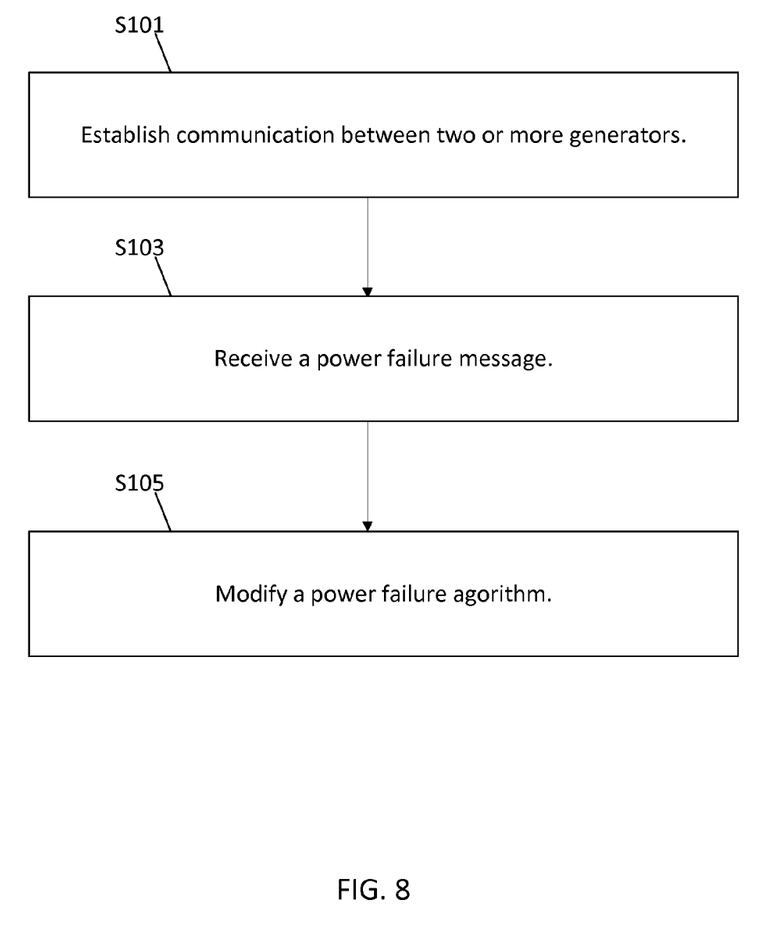
FIG. 8 illustrates an example flowchart for operation of the generator controller of FIG. 7.

FIG. 7 illustrates an example controller (e.g., generator controller 100 or centralized controller 54). The controller may include a processor 200, a memory 201, and a communication interface 203. The communication interface 203 may communicate with a parallel input signal 210, a sensor input signal 212, a throttle control device 214, field coil control device 216, and a paralleling control device 218. Additional, different, or fewer components may be included. FIG. 8 illustrates an example flowchart for operation of the controller of FIG. 7. Additional, different, or fewer acts may be included.

At act S101, the controller (e.g., centralized controller 54) establishes communication between a first generator and a second generator. The communication may include a first on logic or other synchronization technique in which the first generator and the second generator are configured to be connected in parallel to provide power to a common load.

At act S103, the controller receives a power failure message indicative of a power failure of a main power supply for a generator controller of the first or second generator. The power failure message may be transmitted using temporary power stored at the generator. The temporary power may be from a capacitor, a backup battery, or through power over a communication line.

At act S105, the controller may instruct the other generator to modify a failure response algorithm of the first generator in response to the power failure message from the second generator. The failure response algorithm may be modified to temporarily ignore a communication failure from the failing generator. The failure response algorithm may be modified to temporarily disable droop mode or temporarily prevent droop mode from being initiated based on a lack of communication from the failing generator.

Figure 9:
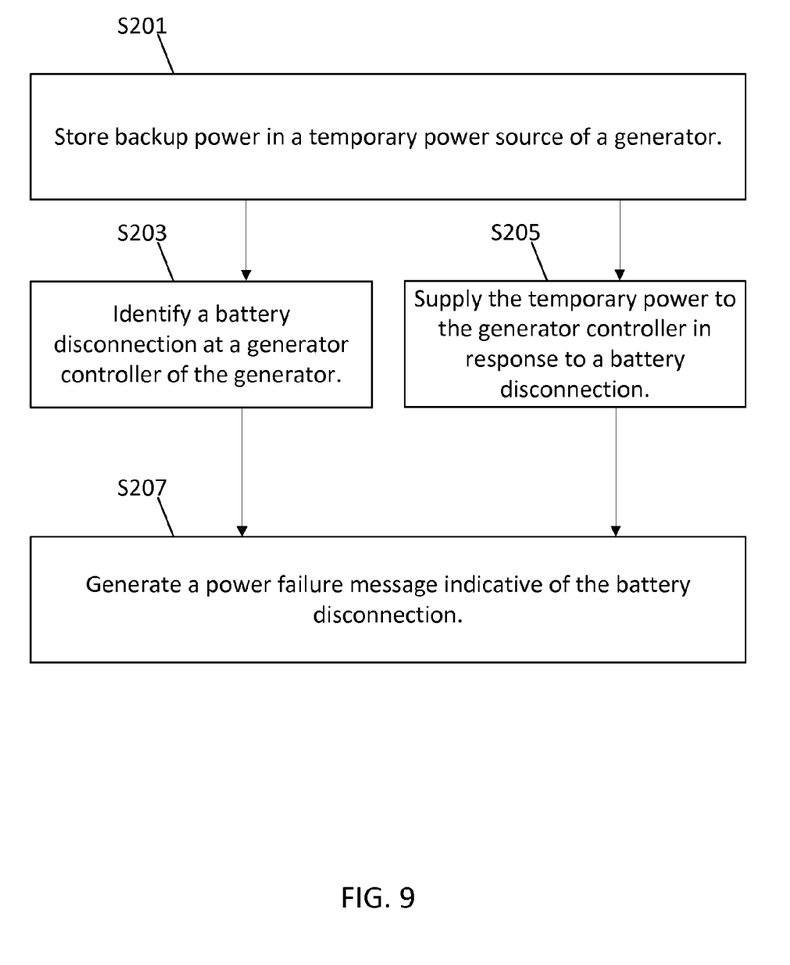
FIG. 9 illustrates an example flowchart for operation of the controller of FIG. 7.

FIG. 9 illustrates an example flowchart for operation of the controller of FIG. 7. Additional, different, or fewer acts may be included.

At act S201, backup power is stored in a temporary source of a generator. The backup may be stored in response to a switching unit that connects the temporary source to be charged by a primary source such as a battery. The temporary source may be a rechargeable battery, a capacitor, a network of capacitors, or another power storage device.

At act S203, the controller (e.g., generator controller 100) identifies a battery disconnection. The battery disconnection may be detected in response to a change in the power input to the controller. In one example, the controller has two power inputs including one input for the primary source and one input for the temporary source. The controller may detect a decrease in voltage from the primary source input and/or an increase in power from the temporary source input. In one example, the controller may include an input (e.g., maintenance button) that the user may activate to indicate that the battery will be removed or other maintenance will be performed. In response, to the maintenance button, the controller may proceed to act S207.

At act S205, the temporary power is supplied to the generator controller in response to the battery disconnection. The controller or a switching unit switches the controller from a primary power source to the temporary power source in response to a failure of the primary power source.

At act S207, the controller generates a power failure message or accesses the power disconnection message from the memory 201 in response to being switched to the secondary power source. The power failure message may indicate that an upcoming loss of communication from the controller is planned, relates to maintenance, or will be temporary. In response to the power failure message, other generators may modify a failure mode.

In one alternative, the controller includes a testing algorithm for testing the capacitor. In the testing mode the controller may switch power from the primary source input to the temporary source input. The controller may drain the capacitor to test that the capacitor can adequately supply power to the controller.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    identifying a disconnection of a first power source from a generator controller of an engine generator set, wherein the generator controller is connected to an alternator and connected to an engine of the engine generator set;
    generating a power failure message indicative of the disconnection of the first power source from the generator controller; and
    transmitting the power failure message indicative of the disconnection of the first power source from the generator controller of the engine generator set using a second power source, wherein the second power source is switched to power the generator controller in response to the disconnection of the first power source.

2. The method of claim 1, wherein the generator controller operates the engine generator set in parallel with at least one other engine generator set.

3. The method of claim 1, wherein the first power source is a battery configured to start or crank the engine generator set.

4. The method of claim 1, wherein the second power source is a temporary power source of the engine generator set.

5. The method of claim 4, wherein the temporary power source is a capacitor.

6. The method of claim 1, wherein the second power source is a communication signal.

7. The method of claim 6, wherein the power failure message includes a code to inform an external controller that the generator controller experienced the battery disconnection or other maintenance related to the battery disconnection.

8. The method of claim 1, further comprising:
sending the power failure message to an external controller for one or more other engine generator sets.

9. The method of claim 8, wherein in response to the power failure message, the one or more other engine generator sets do not change operation in response to a lack of communication from the generator controller.

10. The method of claim 8, further comprising:
repeating the power failure message to the external controller for one or more other engine generator sets according to a time slice assigned to the generator controller.

11. The method of claim 8, wherein the power failure message includes a code to modify a failure mode of the external controller for the one or more other engine generator sets.

12. The method of claim 1, wherein the power failure message includes a code to ignore a cessation of communication messages from the generator controller.

13. The method of claim 1, wherein the power failure message disables a display or an auxiliary device of the engine generator set.

14. The method of claim 1, further comprising:
detecting an end of a battery disconnection at the generator controller; and
performing a synchronization in response to the end of the battery disconnection.

15. The method of claim 1, further comprising:
monitoring temporary power from the second power source to the generator controller; and
detecting when the temporary power to the generator controller meets a threshold,
wherein the power failure message is generated in response to the temporary power meeting the threshold.

16. A method comprising:
establishing communication between a first engine generator set and a second engine generator set, wherein the first engine generator and the second engine generator set are configured to be connected in parallel to provide power to a common load;
receiving, at the first engine generator set, a power failure message indicative of a power failure from a generator controller of the second engine generator set wherein the generator controller is connected to an alternator and connected to an engine; and
modifying a failure response algorithm of the first engine generator set in response to the power failure message from the second engine generator set.

17. The method of claim 16, wherein the power failure message is transmitted using a temporary power stored at the first engine generator set.

18. The method of claim 17, wherein the temporary power is stored in a capacitor.

19. The method of claim 16, wherein the failure response algorithm is modified to temporarily ignore a communication failure from the second engine generator set and accordingly prevent a droop sharing mode at the first engine generator set in response to the communication failure, wherein in the droop sharing mode the first generator set and the second generator set operate independently.

20. An apparatus comprising:
a generator controller configured to operate an engine generator set wherein the generator controller is connected to an alternator and connected to an engine of the engine generator set;
a secondary power source for the generator controller;
a memory including a power disconnection message; and
a switching unit configured to switch the generator controller from a primary power source to the secondary power source in response to a failure of the primary power source,
wherein the generator controller accesses the power disconnection message from the memory in response to being switched to the secondary power source.

* * * * *